US012756029B2

(12) United States Patent
Zhu et al.

(10) Patent No.: US 12,756,029 B2
(45) Date of Patent: Oct. 6, 2026

(54) BATTERY PACK THERMAL MANAGEMENT

(71) Applicant: FORD GLOBAL TECHNOLOGIES, LLC, Dearborn, MI (US)

(72) Inventors: Di Zhu, Novi, MI (US); Shuya Shark Yamada, Novi, MI (US); Charles C. Poon, Canton, MI (US); Jacob Wiles, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 498 days.

(21) Appl. No.: 18/499,738

(22) Filed: Nov. 1, 2023

(65) Prior Publication Data

US 2025/0140962 A1 May 1, 2025

(51) Int. Cl.

| | |
|---|---|
| ***H01M 10/633*** | (2014.01) |
| ***B60L 50/60*** | (2019.01) |
| ***B60L 58/24*** | (2019.01) |
| ***H01M 10/48*** | (2006.01) |
| ***H01M 10/613*** | (2014.01) |
| ***H01M 10/625*** | (2014.01) |
| ***H01M 50/581*** | (2021.01) |

(52) U.S. Cl.

CPC ........... *H01M 10/633* (2015.04); *B60L 58/24* (2019.02); *H01M 10/482* (2013.01); *H01M 10/486* (2013.01); *H01M 10/613* (2015.04); *H01M 10/625* (2015.04); *H01M 50/581* (2021.01); *B60L 50/60* (2019.02); *H01M 2200/10* (2013.01); *H01M 2220/20* (2013.01)

(58) Field of Classification Search

CPC ............. H01M 10/633; H01M 10/482; H01M 10/486; H01M 10/613; H01M 10/625; H01M 50/581

See application file for complete search history.

(56) References Cited

U.S. PATENT DOCUMENTS

| | | | |
|---|---|---|---|
| 5,606,242 | A | 2/1997 | Hull et al. |
| 5,739,670 | A | 4/1998 | Brost et al. |
| 6,246,831 | B1 | 6/2001 | Seitz et al. |
| 2017/0298807 | A1 | 10/2017 | Gubel et al. |
| 2017/0338527 | A1 | 11/2017 | Walton |
| 2022/0013823 | A1 | 1/2022 | Schumacher et al. |

FOREIGN PATENT DOCUMENTS

| | | |
|---|---|---|
| EP | 4144569 A1 | 3/2023 |

*Primary Examiner* — Sarah A. Slifka

(74) *Attorney, Agent, or Firm* — David B. Kelley; Brooks Kushman P.C.

(57) ABSTRACT

The disclosure presents methods for monitoring of thermal activities within a vehicle's battery pack, using sparse sensors throughout the battery pack. The sparse sensors can be thermal sensors. Situations where a thermal sensor is in the location of a thermal event as well as where there is no thermal sensor in the region of a thermal event are contemplated. Each thermal sensor tracks temperature changes in specified regions of the battery, facilitating an overview of the pack's thermal health. By analyzing data from multiple thermal sensors, the system can help to identify areas that exhibit temperature deviations. If fluctuations beyond predetermined thresholds are detected, data can be routed to external systems, allowing for an external evaluation and response.

15 Claims, 7 Drawing Sheets

BATTERY PACK THERMAL MANAGEMENT

TECHNICAL FIELD

This disclosure relates to methods of thermal management for a battery pack.

BACKGROUND

Battery systems, specifically lithium-ion battery packs utilized in vehicles, often comprise multiple cell arrays designed to store and discharge energy. As these systems operate, they produce heat, with some areas experiencing temperature changes at varying rates due to factors like uneven distribution of energy or cooling. Traditional battery management systems may cool the entire battery pack uniformly.

SUMMARY

In one embodiment, a battery system comprises a controller, designed and programmed to perform specific functions. This controller, when detecting from the measured temperatures of a battery pack at varying locations that these locations indicate different rates of temperature rise, has the capability to disconnect a specific cell array of the battery pack that is closest to the location having the greatest rate of temperature increase. This action is taken without disconnecting other cell arrays of the same battery pack.

Additionally, the controller can be further programmed to increase cooling in proximity to the identified location, should the measured temperatures indicate varying rates of increase. In a scenario where such temperature rises are detected, the controller is also capable of generating an alert to inform the driver or system operator. For enhanced communication and control, the controller has the capability to send the gathered temperature data to a remote server. Moreover, it can receive specific commands from this server concerning the disconnect action.

In another embodiment, a method is presented that involves elevating the cooling process near a particular location within a battery pack if that location exhibits a temperature rise rate surpassing a set threshold. This intensified cooling does not affect other locations within the battery pack, especially those experiencing temperature rise rates below this predetermined threshold or those that are distant from the said location. Should a location within the battery pack display a rate of temperature rise that breaches the threshold, the method also includes steps to disconnect the closest cell array and generate alerts. Furthermore, this method discloses the transmission of data pertaining to the rate of temperature rise to a distant server and receiving relevant commands regarding the cooling adjustment.

In yet another embodiment, a vehicle is equipped with a battery pack, consisting of numerous cell arrays, and a programmed controller. If the controller perceives that a specific location within the battery pack has reached a temperature beyond a set threshold, it has the capability to amplify the cooling in proximity to that location without impacting the cooling process of the other remote locations. This programmed controller can also disconnect the cell array closest to the exceeding location, generate alerts, and send the pertinent temperature data to a remote server. Moreover, this controller can receive indications or commands directly from the said server, enhancing its response mechanism.

DETAILED DESCRIPTION

Figure 1A:
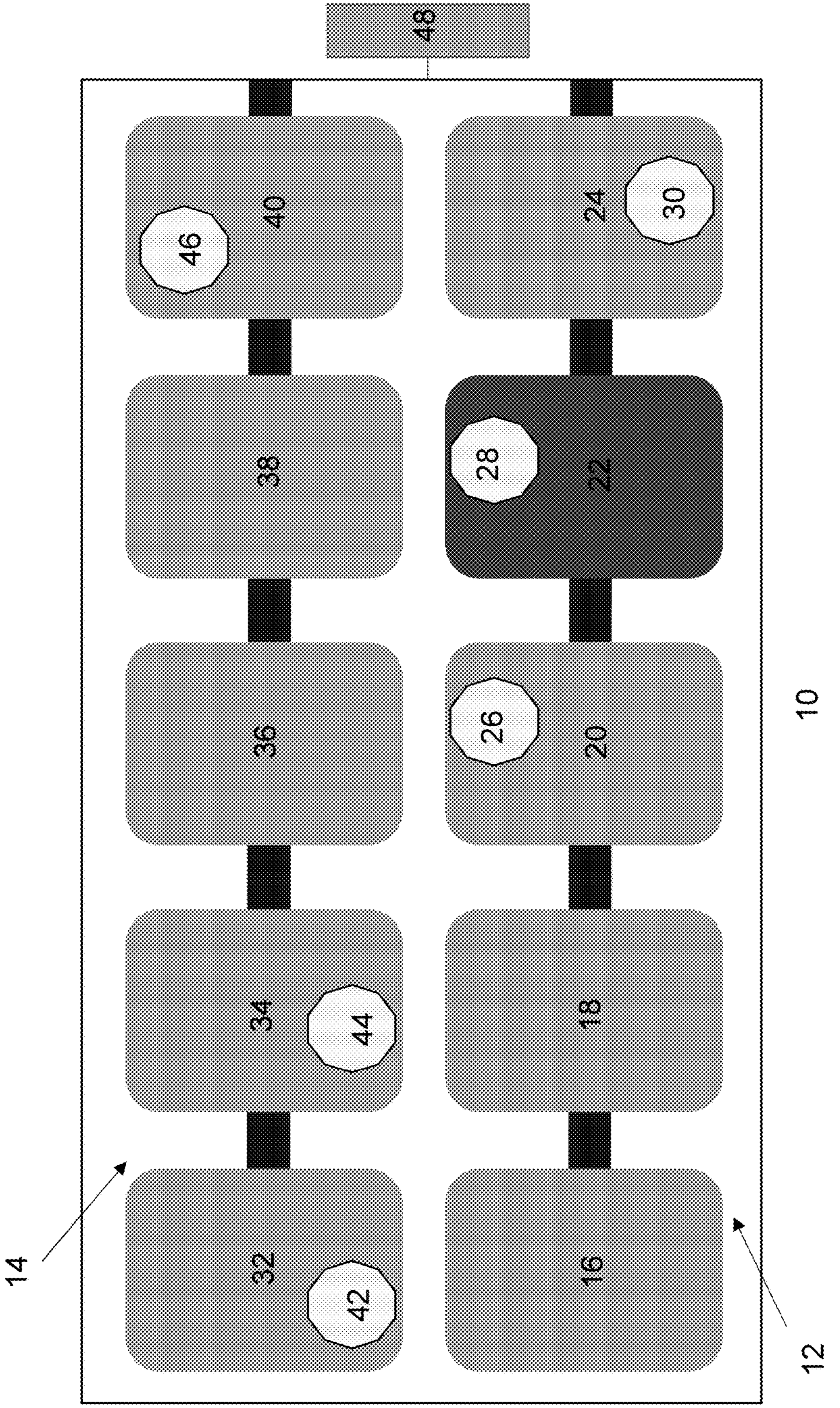
FIG. 1A is a schematic view of a battery cell with sparse sensors.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The disclosure relates to the field of battery pack thermal management, specifically as it relates to heat reduction and efficiency. A battery pack may benefit from continuous monitoring and controlling of its temperature. Within the battery pack, there can be multiple distinct sets of arrays. In an example configuration of two arrays, the first set comprises arrays one through five, while the second set comprises arrays six through ten. In such an example configuration, thermal sensors, which are devices used to measure temperature changes, are not evenly distributed throughout all the arrays. Instead, they are selectively positioned in arrays three, four, five, six, nine, and ten. This sparse distribution can make it challenging to detect thermal events in arrays lacking a thermal sensor. Such gaps in monitoring can sometimes make a thermal event harder to detect based on cell voltage data when the voltage drop is a small amount (e.g., 0.2V) and complicated by factors like voltage rebound and infrequent data sampling (e.g., every 30 s).

This disclosure describes systems and methods of thermal event detection and their management. In one scenario if a thermal event is detected by one thermal sensor within its own array, and subsequently confirmed by another thermal sensor in an adjacent array—using a specific temperature difference (e.g., TD1=15 deg C.) within a particular time frame (e.g., TDT1=400 s)—then the location of the original issue can be narrowed and verified.

In another example scenario, when a single thermal sensor reading exhibits rapid fluctuations beyond a set temperature difference (e.g., TD2=20 deg C.) within a determined duration (e.g., TDT2=60 s), this indicates the thermal event's proximity within the same array, but farther from the thermal sensor.

In a third example scenario, if multiple thermal sensors register an increase in temperature, but none meet a set temperature threshold (e.g., TT1=65 deg C.), the sequence in which these thermal sensors attain a particular temperature difference (e.g., TD3=10 deg C.) within a designated time frame (e.g., TDT3=800 s) can reveal the distance of each from the initial fault.

Referring now to FIG. 1A, the battery pack 10 is displayed. Inside this pack are two distinct sets of arrays. The first set 12 is comprised of individual arrays 16, 18, 20, 22, and 24. Specifically, arrays 20, 22, and 24 are equipped with temperature sensors 26, 28, and 30, respectively. The second set 14 encompasses arrays 32, 34, 36, 38, and 40. Notably, arrays 32, 34, and 40 incorporate temperature sensors 42, 44, and 46, respectively.

The sets of arrays can respectively be placed in separate cooling zones or wired in parallel. In situations where they are wired in parallel, one set of arrays, perhaps the set 12, can be disconnected, leaving the other, say the set 14, fully functional.

Operably configured with the battery pack 10 is a controller 48. The controller 48 receives temperature data from the sensors and as in the scenario described above if an array, like the array 22, shows a significant temperature increase compared to others, the controller 48 can disconnect the array set 12. In other configurations the controller can be programmed to increase cooling around an array experiencing a thermal event or a specified area to counteract the temperature rise.

The controller 48 can also further be programmed to be in operative communication with a driver by sending alerts to a driver if certain temperature thresholds are breached. The controller 48 may also further be programmed to be in operative communication with a remote data server by transmitting temperature data to a remote server for off-site monitoring. This data can further be analyzed by remote teams wherein the controller 48 can be further programmed for receiving and acting on commands from the remote server, allowing for remote adjustments. It is understood that when the controller 48 is described as configured or programmed to do something, that is the functional equivalent of the controller 48 causing or commanding it to be done.

Figure 1B:
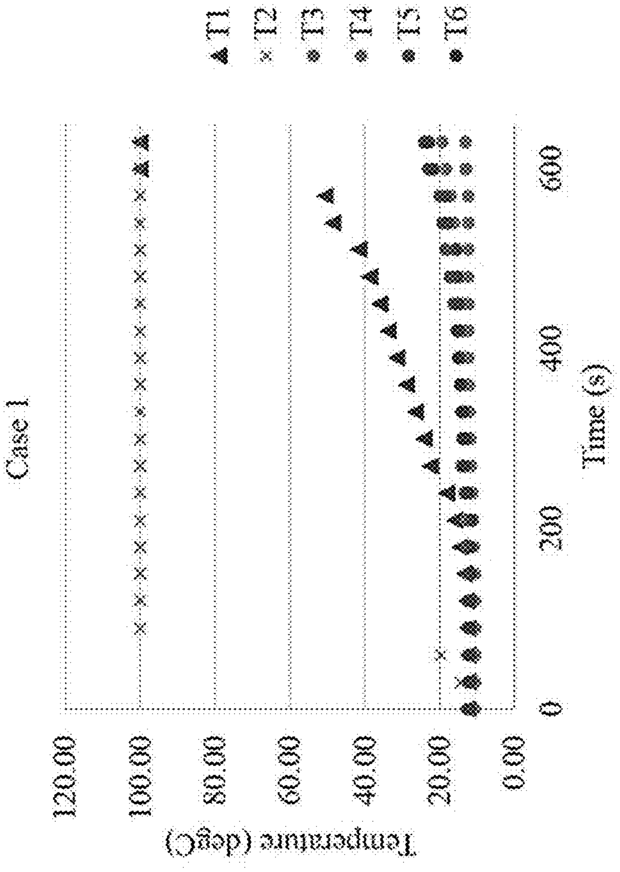
FIG. 1B is a graph of temperature at the sensors.

Referring now to FIG. 1B, the graph reveals a marked temperature elevation in the vicinity of the array 22, as detected by the temperature sensor 28 (or T2). Concurrently, the temperature sensor 26 (or T1) on the adjacent array 20 also records an uptick in temperature. This corroborative data from both sensors suggests a thermal event occurring in the array 22. Specific metrics can be set to gauge these thermal events: a temperature difference a threshold (TD1) of 15° C. and a time duration threshold (TDT1) of 400 seconds. Based on these readings, the following is deduced under an example rule. If a sensor, like the sensor 28 (or T2), detects a thermal irregularity in its native array, and a nearby sensor, such as the sensor 26 (or T1), confirms this within the parameters of TD1 and TDT1, the location of the fault is determined. In this instance, the disruption is traced to the array 22, signaling it as the origin of the thermal event.

Figure 2A:
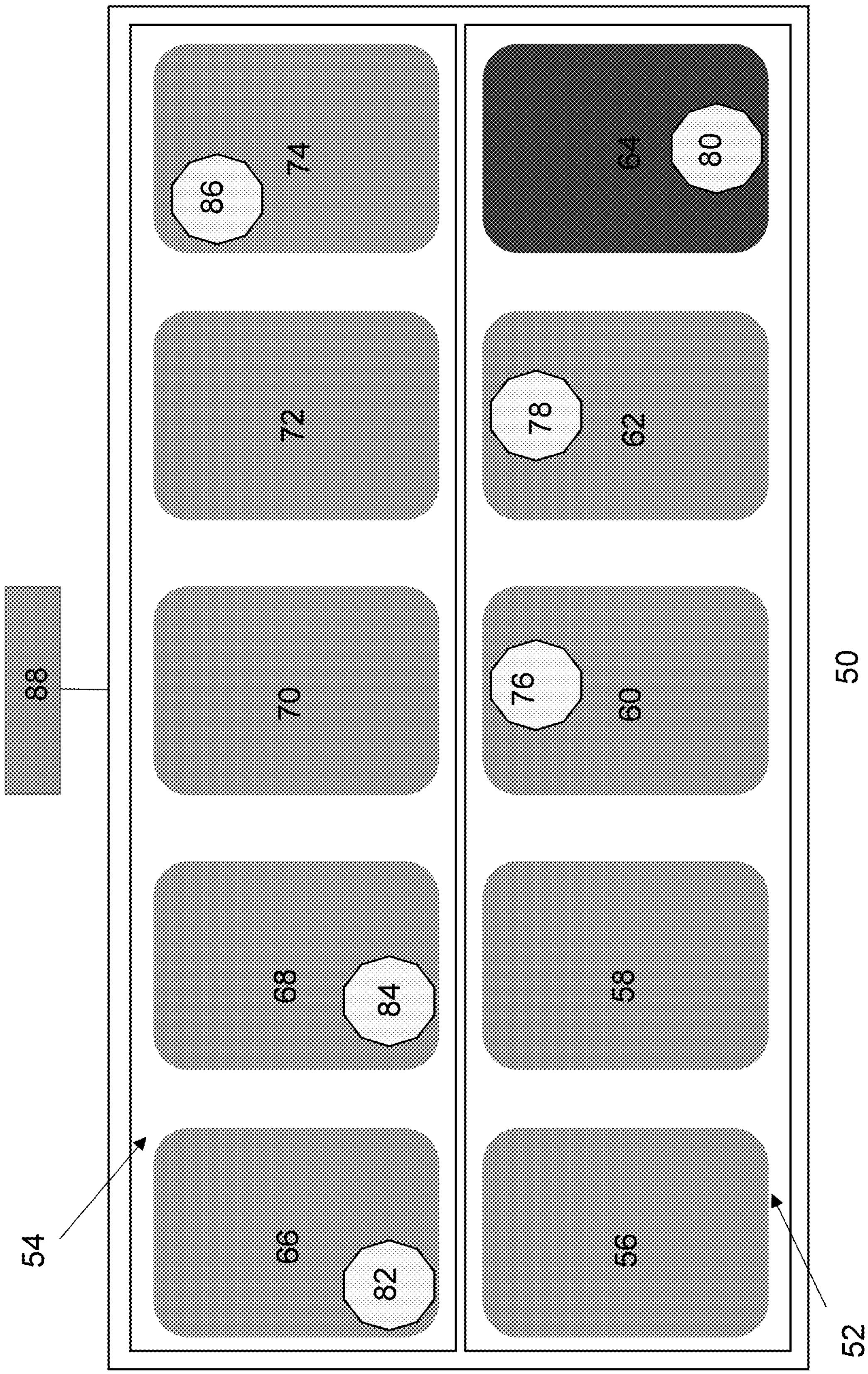
FIG. 2A is a schematic view of a battery cell with sparse sensors.

Referring now to FIG. 2A, we observe the battery pack 50. Within it are two distinct sets of arrays. Set 52 contains arrays 56, 58, 60, 62, and 64. Arrays 60, 62, and 64 are installed with temperature sensors 76, 78, and 80, respectively. The counterpart set 54 houses arrays 66, 68, 70, 72, and 74. Arrays 66, 68, and 74 are fitted with temperature sensors 82, 84, and 86 in that order.

These sets can be managed within separate cooling zones or they might be wired in parallel. In scenarios where they are connected in parallel, a particular set, such as the set 52, can be independently disconnected, keeping its counterpart, the set 54, operational. Integrated with the battery pack 50 is another controller 88. This controller 88 processes the temperature data relayed from the sensors. If a particular array, such as the array 64, registers a temperature spike, the controller 88 can disconnect its associated set, the set 52. The controller 88 can also modulate the cooling within a specific vicinity if an array indicates a thermal event.

The controller 88 can be further programmed to alert the driver if temperature thresholds are exceeded. The controller 88 can also communicate with an external remote server. The controller 88 can also send temperature metrics to this server, enabling remote diagnostics. This off-site data allows external teams to interpret the data, and the controller 88 can be programmed to execute commands dispatched from this remote server. It is understood that when the controller 88 is described as being configured or programmed to do something, that is the functional equivalent of the controller 88 causing or commanding it to be done.

Figure 2B:
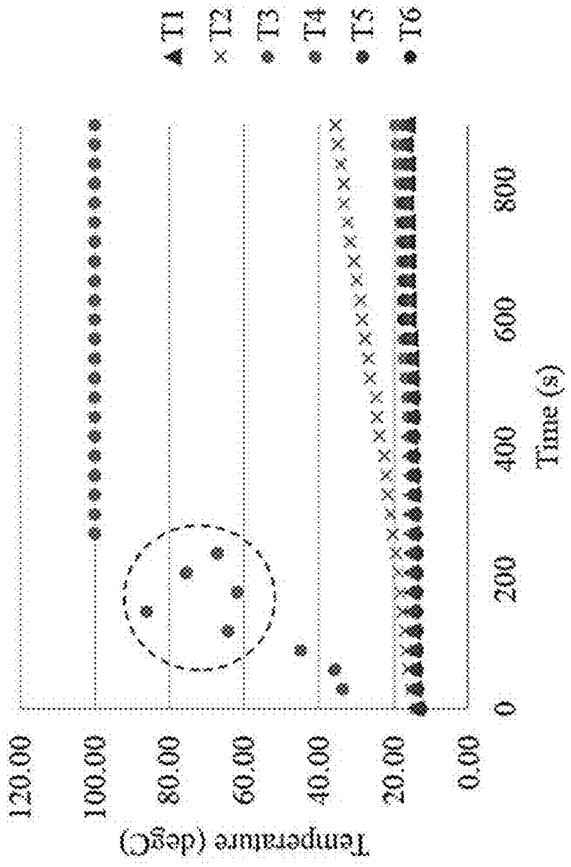
FIG. 2B is a graph of temperature at the sensors.

Moving to FIG. 2B, the graphic representation provides clarity. There is a distinct temperature rise around the array 64, as indicated by the sensor 80 (or T3). The sensor 78 (or T2), from the neighboring array 62, also notes a rise, further confirming the observations of T3. Using parameters such as a temperature difference threshold (TD3) of 20° C. and a duration threshold (TDT) of 60 seconds, the data from both sensors is analyzed by the controller 88. When T3 resonates within the parameters of TD3 and TDT3, it helps identify the area of the thermal event. Another thermistor, T2, in the neighboring array shows a gradual temperature increase. In this instance, the array 64 appears as the segment experiencing the event, marking it for increased cooling.

Figure 3A:
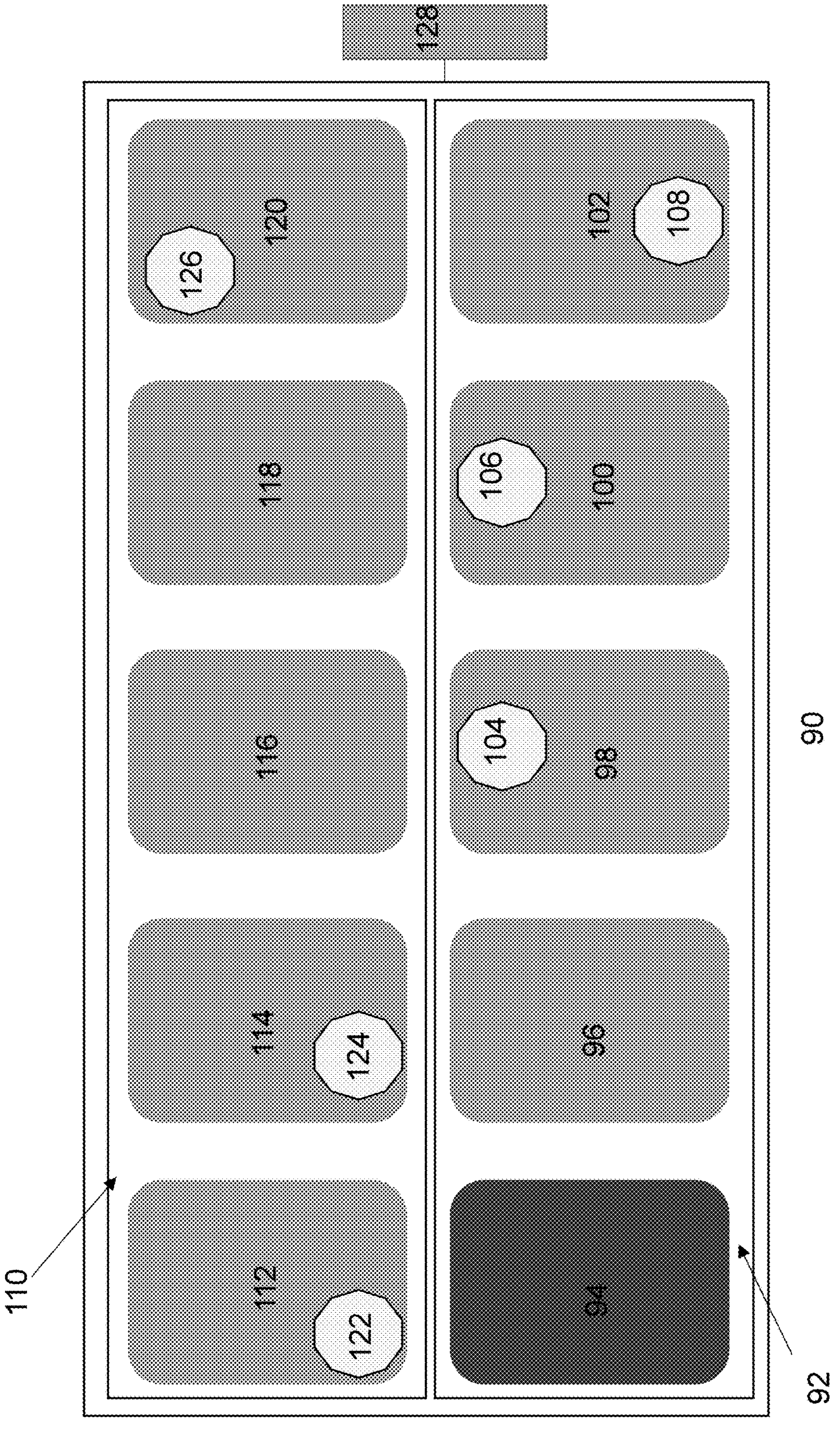
FIG. 3A is a schematic view of a battery cell with sparse sensors.

Referring to FIG. 3A, we observe battery pack 90 of an electric vehicle. Inside, there are two distinct sets of arrays. Set 92 comprises arrays 94, 96, 98, 100, and 102. Among these, arrays 98, 100, and 102 are placed with temperature sensors 104, 106, and 108, respectively. Set 110 holds arrays 112, 114, 116, 118, and 120. From this set, the arrays 112, 114, and 120 are placed with temperature sensors 122, 124, and 126 in that order. Both the set 92 and set 110 can be managed in separate cooling zones or wired separately in parallel. When wired separately, a set like the set 92 can be disconnected, leaving the set 110 functioning.

Within battery pack 90, there is a controller 128. This controller processes the temperature data from the sensors. In situations where the array 94 lacks direct monitoring readings from neighboring sensors like the sensors 122 (T6), 124 (T5), and 104 (T1) provide inferential temperature regarding the array 94. Using these readings, the controller 128 can make decisions regarding the operation of associated sets or arrays. It is understood that when the controller 128 is described as being configured or programmed to do something, that is the functional equivalent of the controller 128 causing or commanding it to be done.

When several sensors indicate a temperature rise but none cross the set mark of TT1=65 deg C., the sequence in which sensors reach a difference of TD3=10 deg C. within TDT=800 s provides insight into the event's origin. Here, the focus is on the inboard cell of the array 94. The controller 128 can also adjust cooling in the vicinity of an indicated location without affecting other areas. The controller 128 can also disconnect specific arrays, produce alerts, and maintain communication with a remote server for data transmission and adjustments.

Figure 3B:
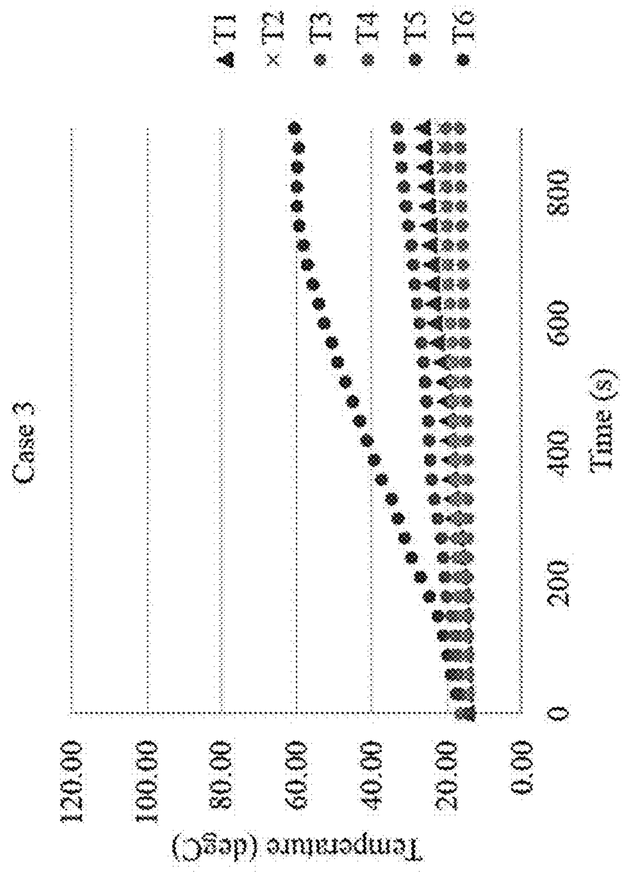
FIG. 3B is a graph of temperature at the sensors.

In FIG. 3B, the graphical representation offers a clearer perspective on the temperature dynamics within the battery pack 90. A noticeable temperature elevation around the array 94 is evident even though it lacks direct monitoring. the coordinated data from neighboring sensors, specifically the sensors 122 (T6), 124 (T5), and 104 (T1) provide the information needed for the controller 128.

The graph plots temperature changes over time, and three lines, corresponding to the sensors 122 (T6), 124 (T5), and 104 (T1) show synchronous spikes. This synchronized uptick suggests that an event is originating near or within the array 94. The sequence in which these lines rise indicates proximity to the source of the event. Even though none of the lines cross the designated threshold of TT1=65 deg C., their simultaneous and sequential rise within the parameters of TD3=10 deg C. over TDT=800 s is indicative of a thermal event. This pattern suggests that the source of the temperature increase is closest to the inboard cell of the array 94.

Figure 4:
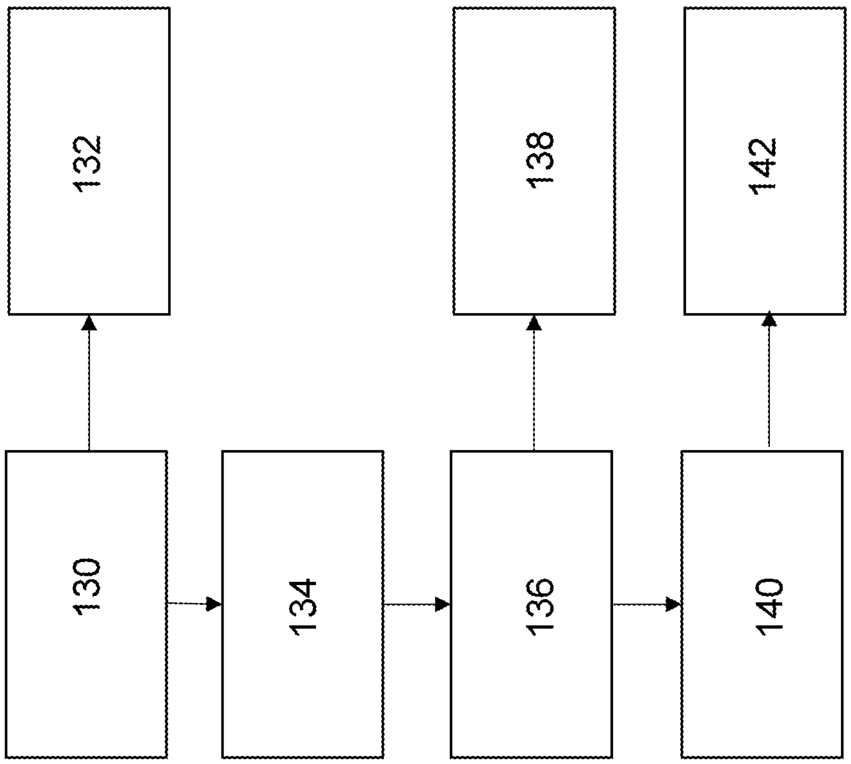
FIG. 4. is a flowchart of an event detection method according to one embodiment of the disclosure.

Referring to FIG. 4, the method begins at decision block 130, a controller receiving temperature data from thermal sensors registers if any of the thermal sensors has detected a temperature change, specifically a rise of 20 deg C. within 60 seconds.

If the outcome at block 130 is YES, the process advances to block 132, suggesting that the source of the thermal event is within the same array but not in the immediate vicinity of the detecting thermal sensor. In the event the controller at block 130 does not identify a rapid temperature rise, the controller moves to decision block 134, asking if any of the thermal sensors has recorded a thermal event. If the result is YES, it then proceeds to decision block 136, which examines if another thermal sensor, located in a different array, also observes the same event.

Should the controller at block 136 affirmatively detect an incident from another array's thermal sensor, block 138 is reached, which concludes that the origin of the event is the array associated with the first-responsive thermal sensor. However, if the outcome of block 136 is NO, the flowchart advances to decision block 140, evaluating if a group of thermal sensors achieves a particular temperature difference, such as an increase of 10 deg C. over 800 seconds. If this condition is met, the method progresses to operation block 142, indicating the closest point to the first-responsive thermal sensor as the likely location of the thermal occurrence. For vehicles with integrated connectivity, the event location can be communicated to a central data hub or cloud system. Specialized engineering units can then utilize this data to assess the event's scope, enabling the remote teams to determine and implement appropriate measures. Although temperature sensors are specified, their equivalent voltage sensors or any such sensors may be used with any of the embodiments.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein.

As previously described, the features of various embodiments may be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A battery system comprising:

a controller programmed to, as a result of measured temperatures of a battery pack at different locations indicating different rates of increase at the locations, disconnect a cell array of the battery pack closest to a one of the locations having a greatest of the rates without disconnecting other cell arrays of the battery pack.

2. The battery system of claim 1, wherein the controller is further programmed to, as a result of the measured temperatures indicating different rates of increase at the locations, increase cooling in a vicinity of the one of the locations.

3. The battery system of claim 1, wherein the controller is further programmed to, as a result of the measured temperatures indicating different rates of increase at the locations, generate a driver alert.

4. The battery system of claim 1, wherein the controller is further programmed to send the measured temperatures to a remote server.

5. The battery system of claim 4, wherein the controller is further programmed to receive commands from the remote server regarding the disconnect.

6. A method comprising:

increasing cooling in a vicinity of a location within a battery pack experiencing a rate of temperature increase that exceeds a predetermined threshold rate without increasing cooling in locations within the battery pack experiencing rates of temperature increase that are less than the predetermined threshold rate and are remote from the location.

7. The method of claim 6, further comprising disconnecting a one of a plurality of cell arrays of the battery pack closest to the location as a result of the location experiencing the rate of temperature increase that exceeds the predetermined threshold rate.

8. The method of claim 6, further comprising generating an alert as a result of the location experiencing the rate of temperature increase that exceeds the predetermined threshold rate.

9. The method of claim 6, further comprising sending data related to the rate of temperature increase to a remote server.

10. The method of claim 9, further comprising receiving commands related to the increasing.

11. A vehicle comprising:

a battery pack including a plurality of cell arrays; and a controller programmed to, responsive to indication that one of a plurality of locations within the battery pack has a temperature exceeding a threshold temperature, increase cooling in a vicinity of the one without increasing cooling in a vicinity of other of the locations remote from the one.

12. The vehicle of claim 11, wherein the controller is further programmed to, responsive to the indication, disconnect a one of the cell arrays closest to the one.

13. The vehicle of claim 11, wherein the controller is further programmed to, responsive to the indication, generate an alert.

14. The vehicle of claim 11, wherein the controller is further programmed to send data related to the temperature to a remote server.

15. The vehicle of claim 14, wherein the controller is further programmed to receive the indication from the remote server.

* * * * *